(12) United States Patent
Dugdale

(10) Patent No.: US 6,552,699 B2
(45) Date of Patent: Apr. 22, 2003

(54) MULTIPLE TARGET PROJECTOR SYSTEM AND METHOD

(75) Inventor: Jonathan L. Dugdale, Burleson, TX (US)

(73) Assignee: L-3 Communications Corporation, New York, NY (US)

( * ) Notice: Subject to any disclaimer, the term of this patent is extended or adjusted under 35 U.S.C. 154(b) by 282 days.

(21) Appl. No.: 09/726,892

(22) Filed: Nov. 29, 2000

(65) Prior Publication Data

US 2002/0063665 A1 May 30, 2002

(51) Int. Cl.[7] .................................................. G09G 5/00
(52) U.S. Cl. ............................... 345/7; 345/87; 434/44; 348/121; 349/5
(58) Field of Search ......................... 345/1.1, 1.3, 4–7, 345/9, 32, 87; 434/44; 348/51, 54, 121–124, 744, 759; 353/34, 48, 49; 359/443; 349/5

(56) References Cited

U.S. PATENT DOCUMENTS

| | | | | |
|---|---|---|---|---|
| 4,352,664 A | * | 10/1982 | Morrison et al. | 434/14 |
| 5,023,725 A | * | 6/1991 | McCutchen | 348/38 |
| 5,137,450 A | * | 8/1992 | Thomas | 434/44 |
| 5,320,524 A | * | 6/1994 | de Beus | 432/103 |
| 5,566,370 A | * | 10/1996 | Young | 348/36 |
| 6,128,132 A | * | 10/2000 | Wieland et al. | 359/463 |

* cited by examiner

Primary Examiner—Richard Hjerpe
Assistant Examiner—Alexander Eisen
(74) Attorney, Agent, or Firm—Andrew L. Tiajoloff

(57) ABSTRACT

A projector system has an image display with at least two image display portions each displaying a respective image. At least two projection assemblies are provided, each associated with a respective image display portion. These projection assemblies each receive a respective image from the respective image display portion and project this image onto the projection screen. The projection assemblies each include a system for independently and selectively locating the projected image on the screen. The projection assembly includes a stationary mirror supported adjacent the image display portion receiving the image therefrom and reflecting said image outwardly from the image display to the movable mirror. Preferably, the stationary mirror has an upper end portion and a lower edge portion. The lower edge portion is adjacent the image display portion and the mirror extends obliquely upwardly therefrom. Most preferably, the stationary mirror flares outwardly from the lower edge portion, and the stationary mirrors are grouped together over the image display, with the lower edge portions of adjacent stationary mirrors being supported generally perpendicular to each other.

43 Claims, 9 Drawing Sheets

MULTIPLE TARGET PROJECTOR SYSTEM AND METHOD

FIELD OF THE INVENTION

This invention relates to the field of projection systems, and more particularly to the field of projection systems for vehicle simulators.

BACKGROUND OF THE INVENTION

Simulation systems are often used to simulate systems and vehicles, especially aircraft, for training users or pilots. In these simulation systems, an out-the-window scene is generated and displayed to the user. The image is generated as pixels and projected on one or more projection screens to constitute a field of view covering a substantial area. The projected out-the-window (OTW) image is consequently so much enlarged that it has a rather coarse, low resolution.

It is desirable to display at least certain objects, such as other aircraft, in small enough resolution to train a user to see and recognize targets at great distances such as those in the real world, i.e., at or near eye-limiting resolution. As an example of the target resolution now desired, it has been expressed that a desirable standard would be that a trainee in an aircraft simulator would be able to discern the attitude of a target aircraft at a simulated distance of two to three miles.

This level of resolution cannot be achieved with the coarse projected pixels of the larger OTW imagery. To try to improve target resolution, projector systems have been developed that include a separate higher-resolution target projector that projects a single higher-resolution target image on the screen superimposed with a lower resolution background image.

The prior art projectors, however, have the very substantial drawback that they can project only one target on the screen at a time. If a simulation is desired in which multiple targets are present on the screen, a second projector must be provided at substantial additional cost, especially where the simulator has a large number of screens are used. For example, in a Raytheon SimuSphere simulator system, there are nine faceted screens. To provide enough single-target projectors to afford four active targets in the overall field of view would require four single-target projectors for each screen, totaling 36 target projectors needed. With the cost of each current-technology target projector at about 100,000 U.S. year 2000 dollars, such a system would be too expensive to be practical.

In addition to being very expensive and having only single target functionality, prior art target projectors are generally too large, making them difficult to package, and also difficult to place in a structural environment inside or around the simulator that is already crowded with other projectors and support equipment. Furthermore, the prior art projectors often are monochrome, reducing the realism of the projected display.

SUMMARY OF THE INVENTION

Accordingly it is an object of the invention to provide a projection system that allows for the projection of multiple high-resolution images with a single projector.

This object is achieved by providing a projector system having an image display with at least two image display portions each displaying a respective image. At least two projection assemblies are provided, each associated with a respective image display portion. These projection assemblies each receive a respective image from the associated image display portion and project this image onto the projection screen. The projection assemblies each include a system for independently and selectively locating the projected image on the screen.

In a preferred embodiment, the projection assembly includes a stationary mirror supported adjacent the image display portion receiving the image therefrom and reflecting said image outwardly from the image display to the movable mirror.

Preferably, the stationary mirror has an upper end portion and a lower edge portion. The lower edge portion is adjacent the image display portion and the mirror extends obliquely upwardly therefrom. Most preferably, the stationary mirror flares outwardly from the lower edge portion, and the stationary mirrors are grouped together over the image display, with the lower edge portions of adjacent stationary mirrors being supported generally perpendicular to each other.

In another aspect of the invention, the system for locating the projected image includes a movable mirror supported on a controlled support system selectively positioning the movable mirror in varying angular positions.

It is further an object of the invention to provide a method of projection that overcomes the disadvantages of the prior art. According to the inventive method, a background projector and a target projector are provided, both positioned so as to project images on a screen. The target projector includes a target image display having at least two image display portions each configured to display a respective image. Each image display portion has associated therewith a respective target projection assembly for receiving and projecting the image on the projection screen. Each projection assembly includes a system for independently and selectively locating the projected target image on the screen. The method further includes causing the background projector to project a background image on the screen, forming target images on said display portions of the target projector, and causing the target projector to locate said target images on said projector screen. The target images are at a higher resolution than the background image.

According to a preferred embodiment, the target images are formed with a distortion to compensate for any angular alignment of the screen with the target projector.

Other objects and advantages of the invention will become apparent from the specification herein.

DETAILED DESCRIPTION

Figure 1:
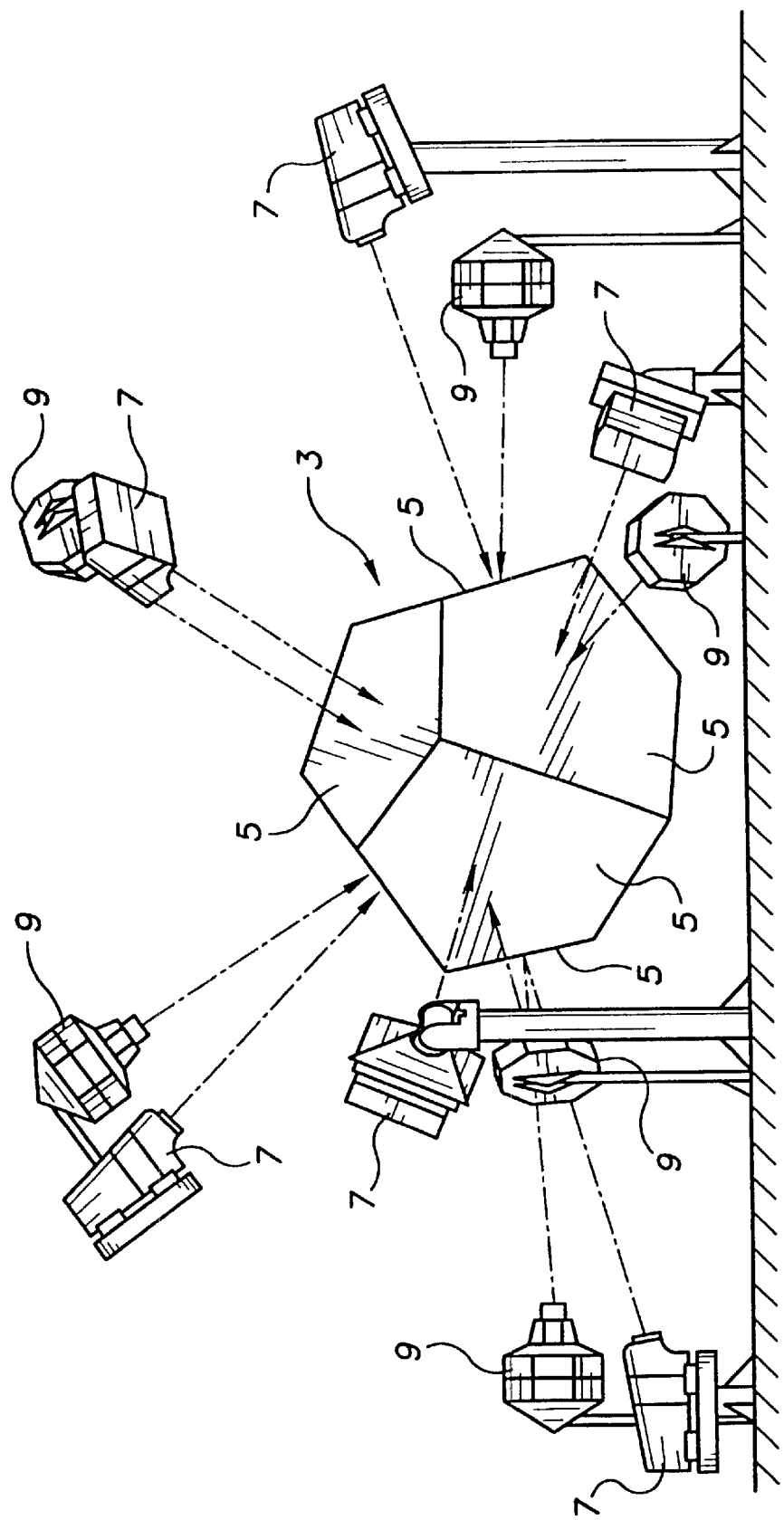
FIG. 1 is a side view diagram of a simulation system having a projection system according to the invention.

According to the preferred embodiment, as best seen in FIG. 1, a simulator system is provided, in this example one for simulating an aircraft. The exemplary system includes a projection screen system sold by L-3 Communications Corp., Link Simulation and Training Division, Arlington, Tex., under the name SimuSphere. It will be understood, however, that the present invention may be applied to any of a variety of simulator projection systems other than the one of the present illustration.

In the illustrated system, the user or trainee is enclosed in a projection screen system in the form of simulation chamber 3, which is comprised of a number of planar rear-projection screens 5 supported by an external support structure (not shown). A number of projectors 7 surround the projection screen system 3, each projector 7 being supported so as to be directed at a respective screen 5. Some of these projectors are mounted on posts extending up from the floor of the location, while the projectors 9 above the screen system 3 are usually supported on an elevated platform (not shown).

The host computer system that runs the simulator includes an image generating system connected with the simulator controls and other sensors of the simulator system to generate real-time background images for projection to be viewed by the user. The image generator transmits the images to the individual projector 7 responsible for the given region of the projection screen system.

Each screen 5 also has associated therewith a respective target projector 9 that is also connected with the image generator. The image generator also sends imagery data and commands to these target projectors, and responsive to this data and commands, the target projectors 9 each project, when appropriate, targets or other objects on the associated screen 5 at a resolution higher than the resolution of the images projected by projectors 7. The use of the higher resolution target projector allows the background image to be of even lower resolution, reducing computational load in preparing those images.

Figure 2:
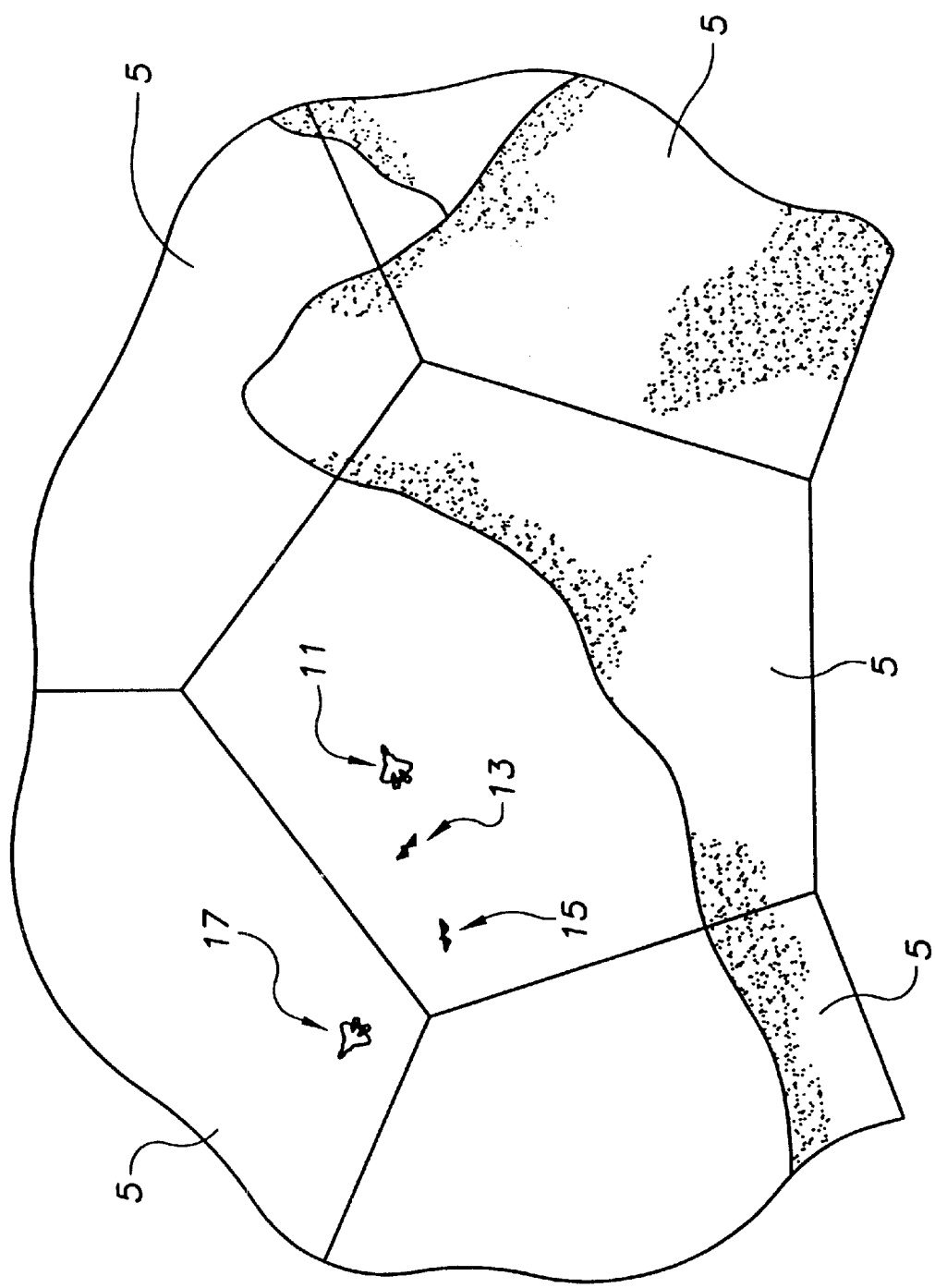
FIG. 2 is an exemplary view of a simulated OTW scene displayed according to the invention.

FIG. 2 shows an example of an OTW scene projected on the screens 5. The projectors 7 project the background scene visible therein, i.e., the hills, the sky, etc., which is prepared by the image generator as a set of images each defined as a matrix of pixels, as is well known in the art. Each individual projector 7 projects one of the background images on its associated pentagonal screen 5.

Also, where the simulation requires, targets, such as enemy or friendly aircraft 11, 13, 15, and 17, ground vehicles, or other stationary or mobile installations are also projected on the screens 5. These targets are projected so as to simulate real-world resolution, i.e., at or near eye-limiting resolution, to increase the realism of the simulation and the effectiveness of the training. This level of projected resolution of the background projectors 7 is too low to approximate this eye-limiting resolution because each projector 7 must provide an image to the entire area of the pentagonal screen 5 with which it is associated. Each screen 5 is about five feet across, and even a fairly high number of pixels applied over this area would not be near the resolution of human visual acuity.

Therefore the targets are projected on screens 5 by the separate target projectors 9, which are able to project at least four independently positioned and movable targets with much higher resolution. Each target projector 9 projects targets for only the screen 5 associated therewith, so, in the example of FIG. 2, targets 11, 13, and 15 are all projected by one of the target projectors, and target 17 is projected by another target projector associated with the adjacent screen 5. As a target crosses from one screen to the next, the image generator transfers the image of the target from the first target projector to the one associated with the next screen 5. According to the preferred embodiment each target projector is capable of projecting at least four independent target images on the associated screen.

Figure 3:
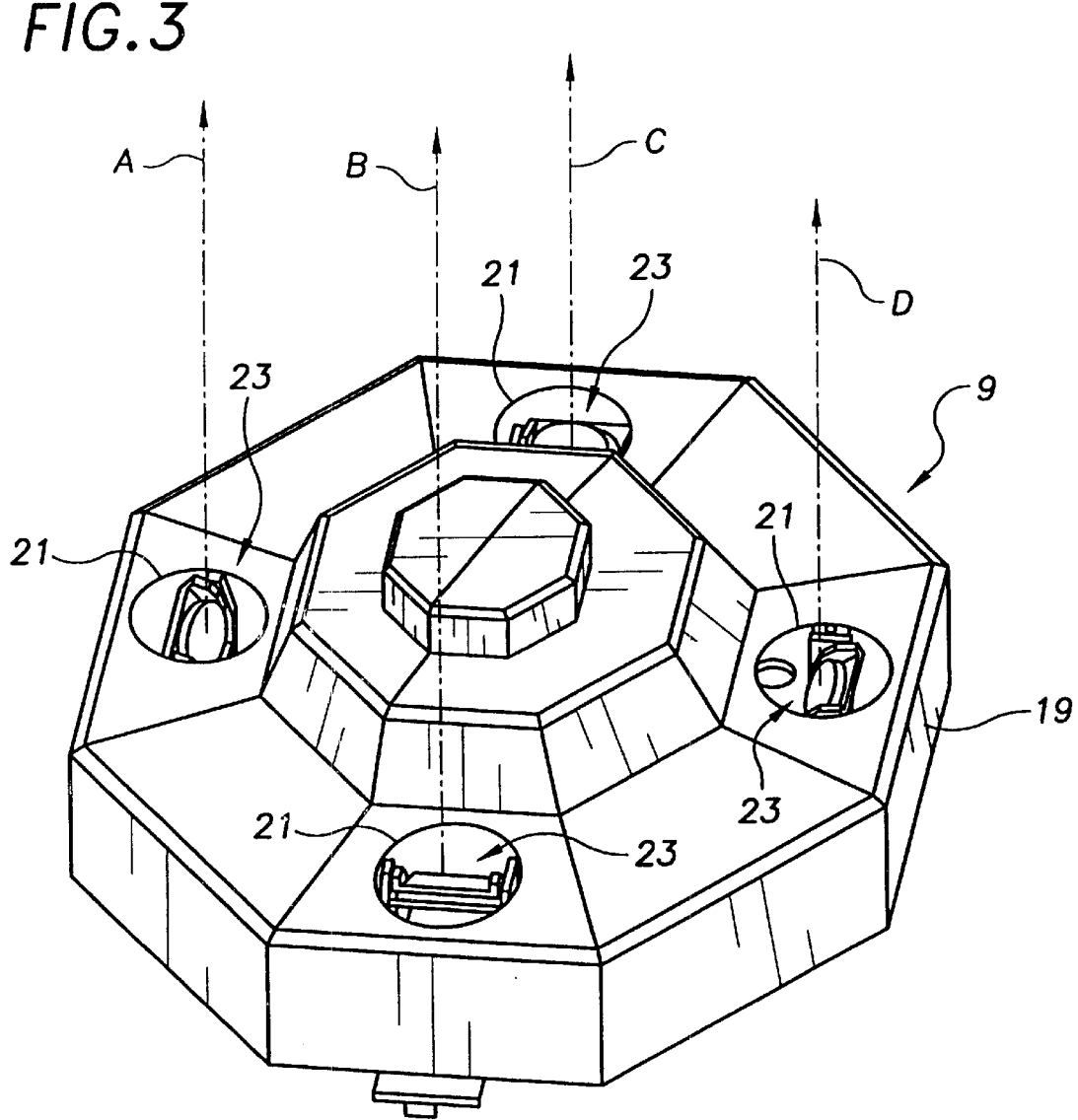
FIG. 3 is a perspective view of a target projector according to the invention.

The external structure of the target projectors 9 is best seen in FIG. 3. The target projector 9 has an external cover 19 with a plurality of apertures 21 therein. A target image is projected through each of these apertures 21 along an independently controllable projection path A, B, C, and D by a projection assemblies which each include a controlled gimbaled mirror structure, generally indicated at 23.

Figure 4:
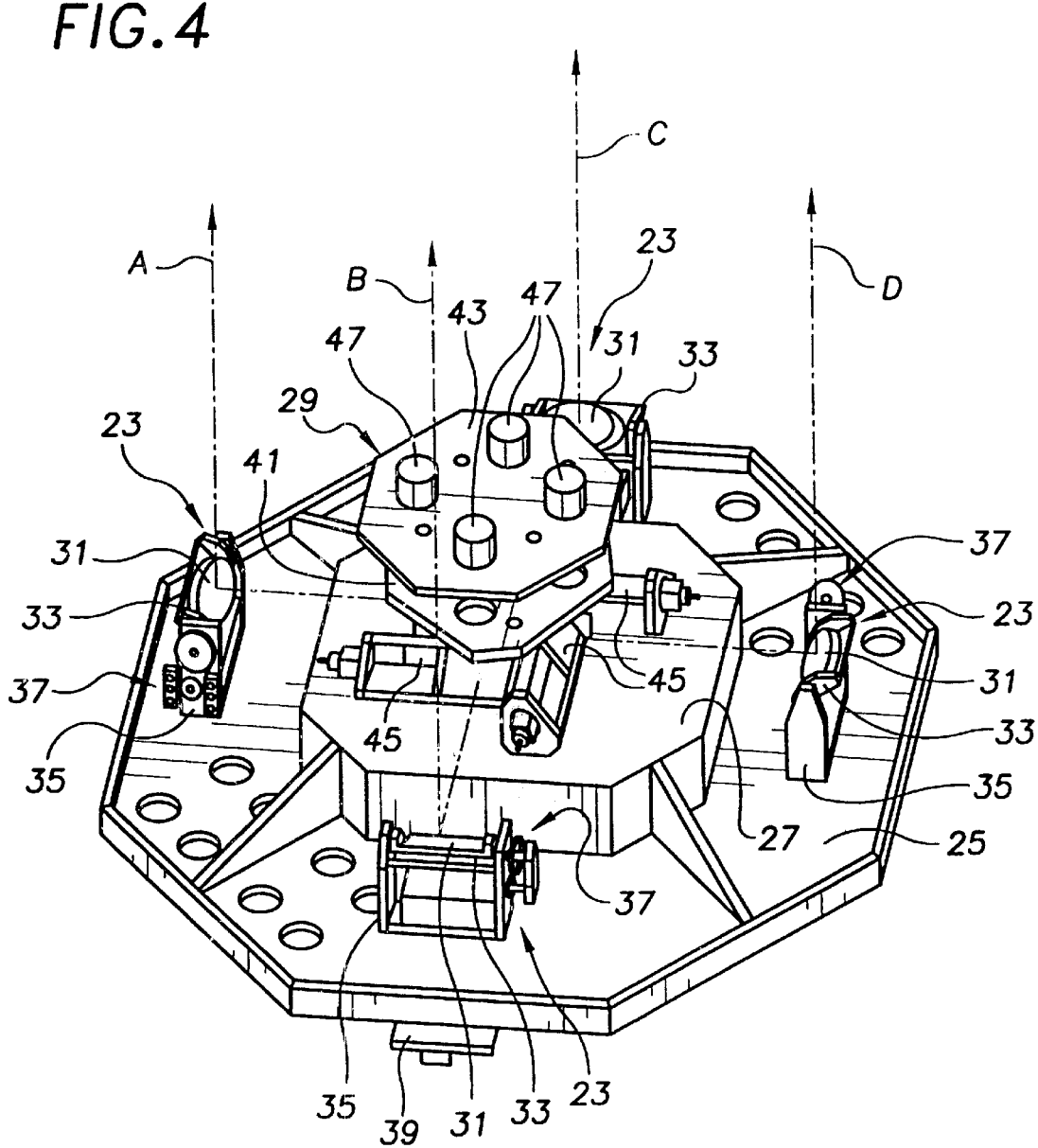
FIG. 4 is a perspective view of a target projector according to the invention with the cover thereof removed.

Referring to FIG. 4, as may be seen when the cover 19 is removed, the target projector 9 includes a base plate 25 on which the mirror structures 23 are supported, and a raised center portion 27. The center portion 27 supports a central assembly indicated at 29 mounted thereon.

Each mirror structure 23 includes a silvered mirror 31 secured in a tray 33 pivotally supported on a mounting structure 35 to provide a gimbal assembly. Tray 33 pivots about an axis parallel to the surface of the base plate 25 and is positioned so that the rotational axis lies on the reflective surface of the mirror 31. The position of the tray 33 is controlled by servomotor system 37, which selectively rotates tray 33 responsive to commands from the image generator and connecting intermediate circuitry.

Each mirror structure 23 is mounted so that the mounting structure 35 is rotatable about a vertical axis perpendicular to base plate 25. The rotation about this axis is controlled by an azimuth drive assembly 39 under base plate 25 connected with a pivot extending downward from mounting structure 35 through the base plate. Each azimuth drive assembly includes a servomotor and is controlled by the image generator and the connecting circuitry, or, during maintenance, manually by an operator using a joystick or a keyboard.

Central assembly 29 includes first and second support plates 41 and 43 fixedly supported over four partially silvered beamsplitters 45. Four optical sensors or photocells 47 are supported in second support plate 43. These components coact with the mirror structures 23 to automatically align the target projector 9 during installation, based on principles analogous to those disclosed in U.S. Pat. No. 5,707,128 to Jonathan L. Dugdale, which is herein incorporated by reference. At installation, the mirror structures 23 are rotated to a 45-degree angle relative to base plate and at 90 degrees to the centerline of base plate 25 passing through the mirror structure 23. Preselected points of light are then illuminated on the associated screen 5. The light from these points enters the target projector 9 through apertures 21 and is reflected by mirrors 31 to center assembly 29. Solenoids are activated which slide the beamsplitter mirror 45 into the path of incoming light. If the target projector is properly aligned, the light is reflected by each mirror 31 to a respective beamsplitter 45, and then to a respective photocell 47, which produces a signal indicating optical alignment. The target projector 9 is repositioned during installation until this alignment is achieved. Once the adjustment is completed, the solenoids are switched off and the beamsplitter mirrors 45 are retracted by springs to prevent these mirrors 45 from obstructing operation of the target projector 9.

Figure 5:
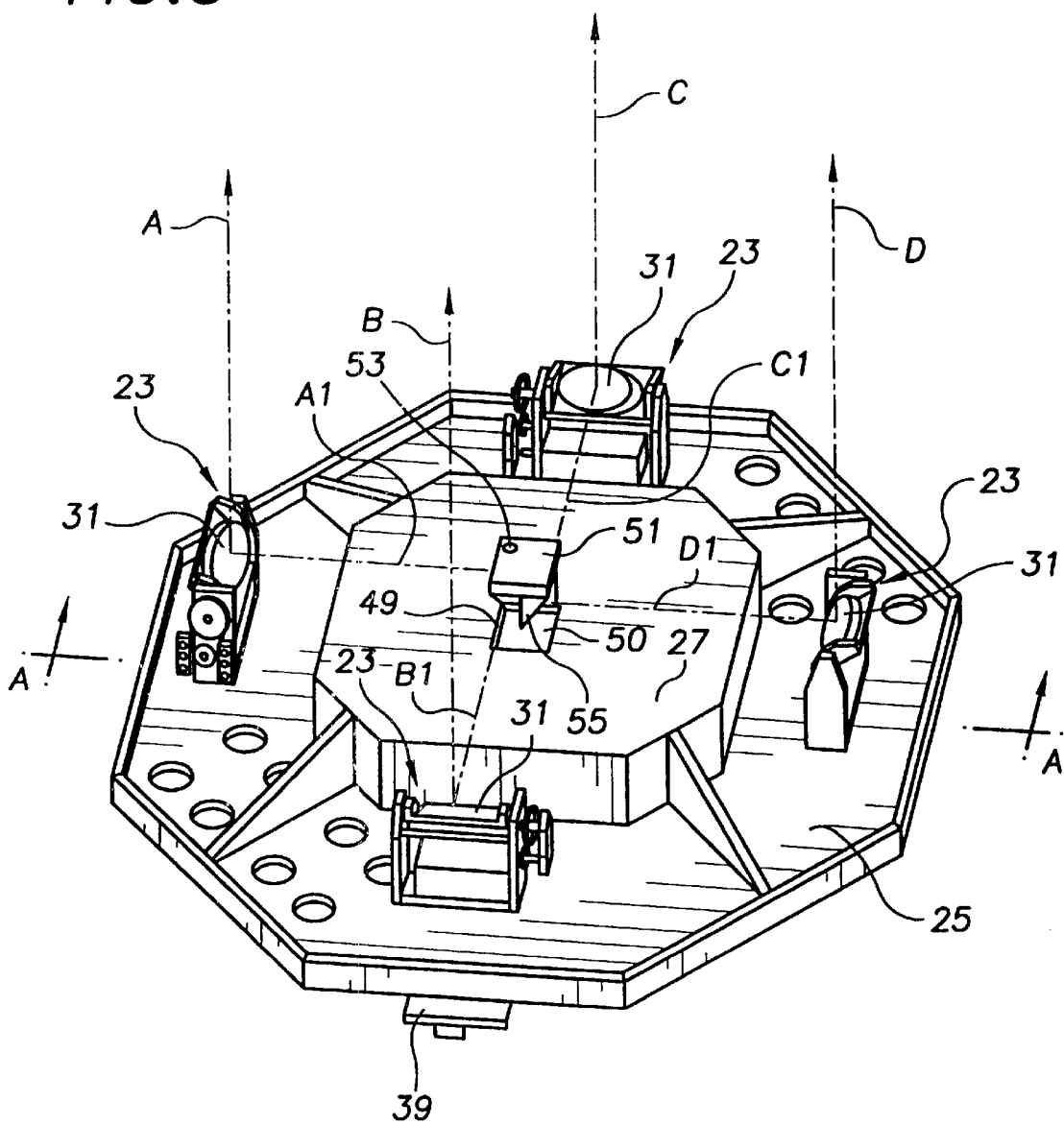
FIG. 5 is a perspective view of the target projector of FIG. 4 with the automatic alignment system removed.

In FIG. 5, the target projector 9 is shown with the central alignment assembly 29 and beamsplitters 45 removed. Center portion 27 of base plate 25 has a square aperture 49 therein, and image display screen 50 is supported in this aperture 49. A mirror assembly 51 is supported on the underside of first support plate 41 (FIG. 4) directly above the image display screen 50.

Figure 6:
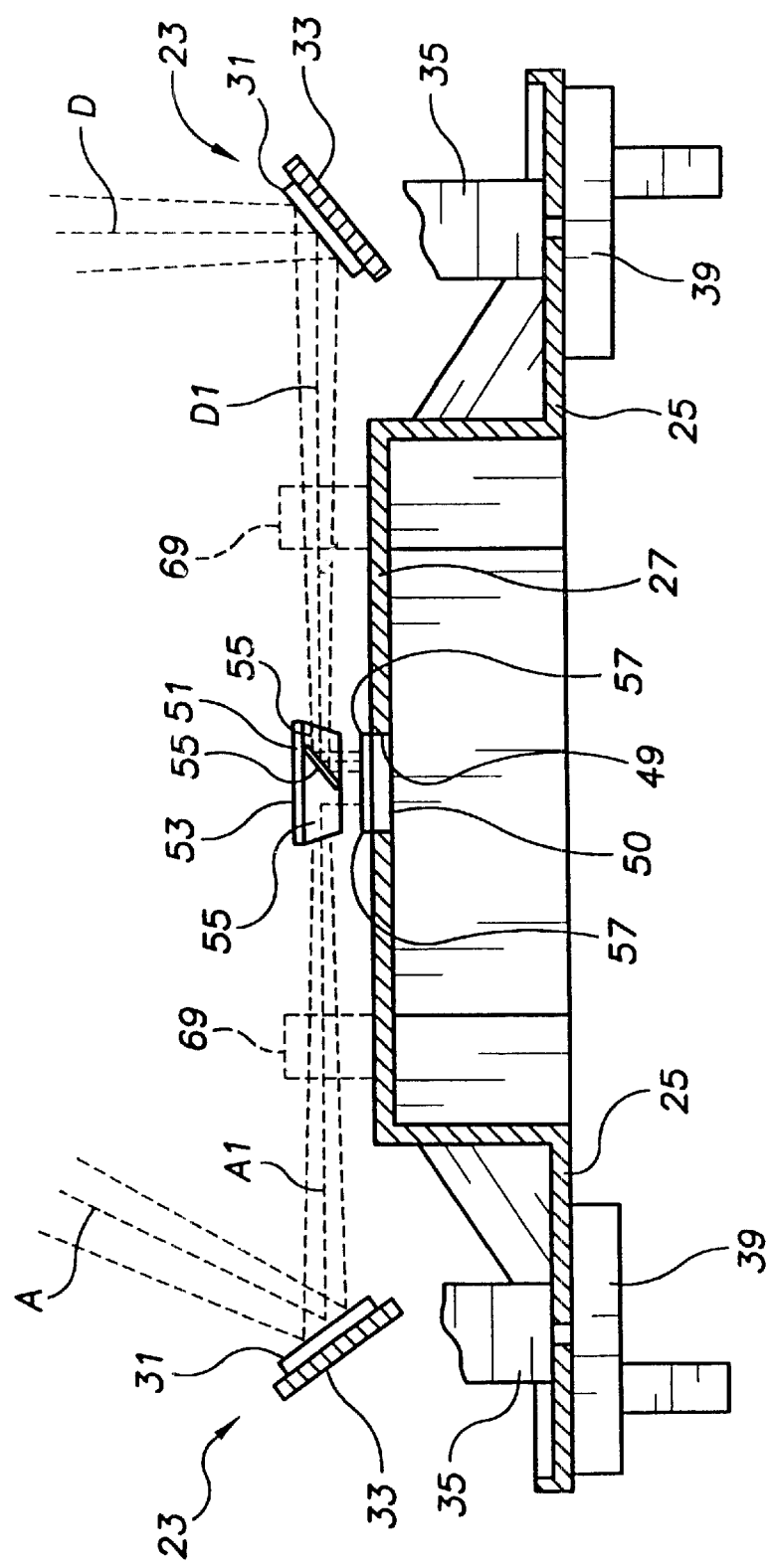
FIG. 6 is a sectional view taken along line A—A of FIG. 5.
Figure 8:
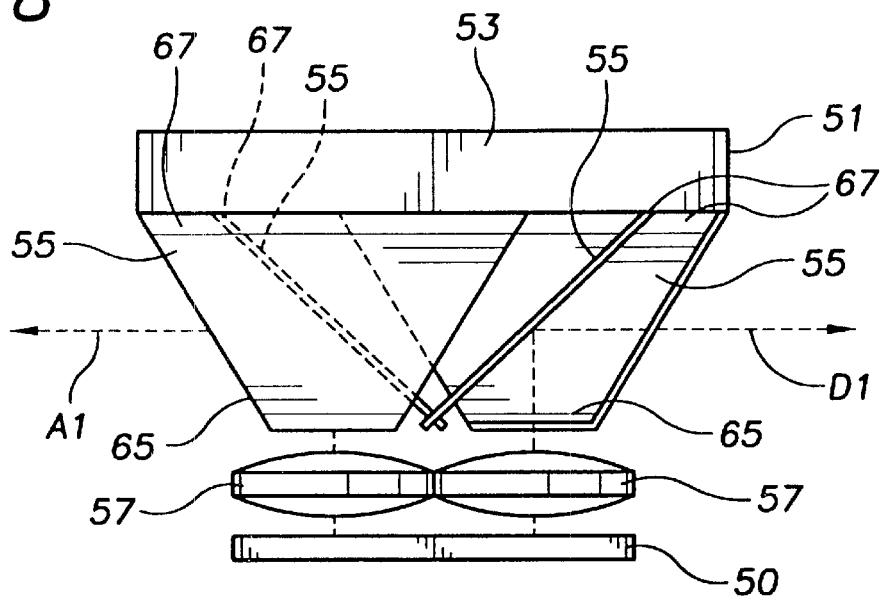
FIG. 8 is detailed side view of the image display, lens assembly and stationary mirrors of a target projector.

As best seen in FIGS. 5, 6 and 8, the mirror assembly 50 includes a supporting plate 53 and four mirrors 55 extending obliquely downwardly from the supporting plate 53 so that the lower edges of the mirrors 55 thereof are adjacent to the image display screen 50. A lens assembly 57 overlies the image display screen 50 and transmits the light therefrom upward as conically expanding beams to the mirrors 55 which direct the beams thereof radially outwardly of the central portion 27 along centerline paths A1, B1, C1 and D1 to the gimbaled mirror structures 23, to be directed against the screen in selected positions as required by the image generator system. It will be understood that in the assembled target projector, during the installation alignment discussed previously, the beamsplitters 45 are pushed by solenoids to lie in these paths, but, after installation, the solenoids are released and the beamsplitters 45 retract out of the way.

The target projector of the present invention may be used with a variety of image sources. The image display screen may be the output of a commercial projector using digital micromirror devices ("DMD"), liquid crystal diodes ("LCD"), integrated light amplification ("ILA") technology as developed by Hughes and JVC, digital light processing ("DLP"), or variants or analogues thereof, or any of a variety of other projection or display technologies. One such projector is the DMD projector sold by Davis A/S of Drammen, Norway, and another is sold by Christie Digital Systems, Inc. Ktchener, Ontario, Canada. However, in the preferred embodiment the image display screen 55 is a microdisplay unit based on active matrix liquid crystal diode ("AMLCD") or DMD, or other suitable technology, and most preferably a DMD microdisplay such as those developed by Texas Instruments. These DMD microdisplays are approximately one inch in diagonal measurement, but have a display of at least 720 ● 720 pixels.

Figure 7:
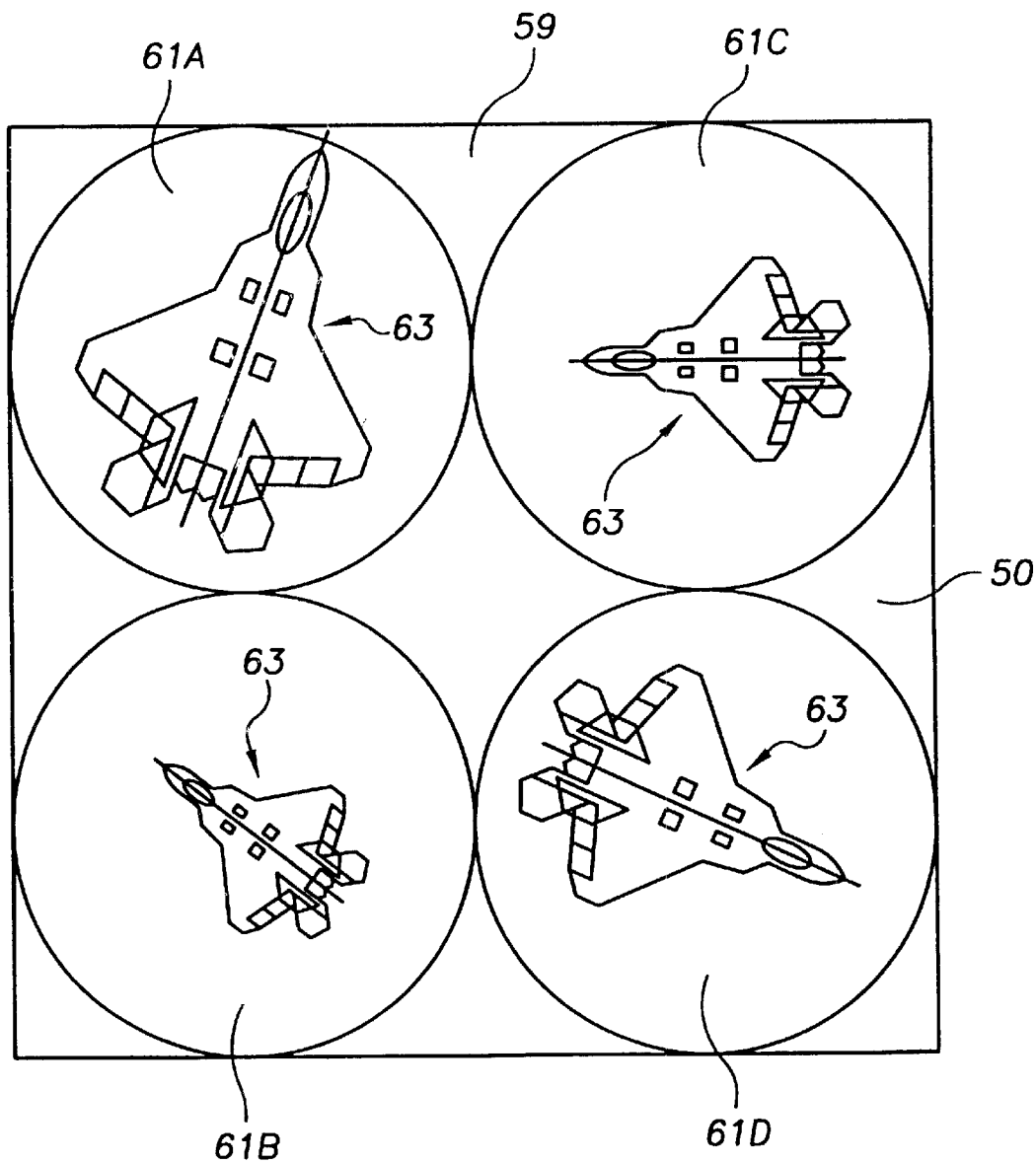
FIG. 7 is a view of an exemplary display on the imaging screen of the target projector.

The target image projected or created in the microdisplay is exemplified in FIG. 7. The image display field 59 is divided into four equal-sized quadrants or sectors each containing a respective image portion 61A, 61B, 61C, and 61D each having therein a target image 63 defined by the set of pixels therein. In the preferred embodiment the image portions are circular, to pass properly through the circular lenses of lens assembly 57, and the diameter of the circular field represents 360 pixels, i.e., half of the pixel dimension of the entire microdisplay.

The target imagery received by the display screen 55 from the simulator image generating system is a standard RGB signal produced by video cards, such as VGA, XGA, or SXGA boards, HDTV, or other similar video formats. These boards are either supported in the target projector 9 in the concave underside of center portion 27 of base plate 25, or as part of the image generating system.

Projection of the target images 63 is best understood by reference to FIGS. 6, 9, 10 and 11, which define the optical assembly that brings each target image on image screen 59 to be projected on screen 5. This optical assembly comprises, for each image portion 63, a respective lens assembly 57, a respective stationary trapezoidal mirror 55, and a respective gimbaled mirror structure 23.

Figure 9:
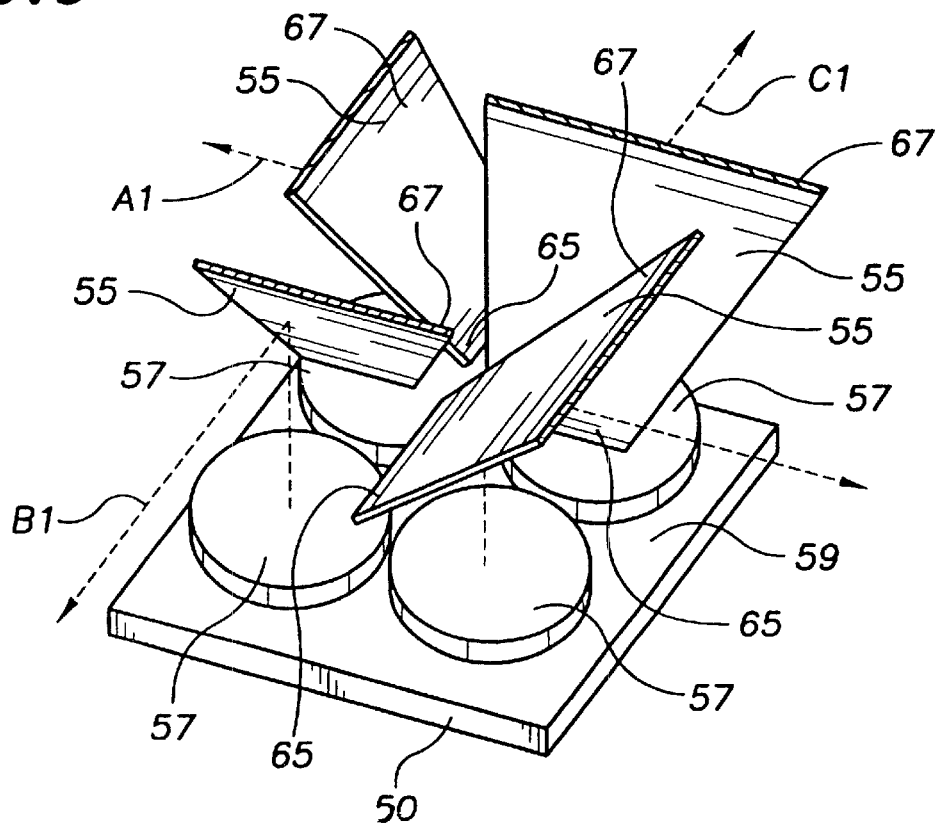
FIG. 9 is a perspective view of the detail view shown in FIG. 8.
Figure 10:
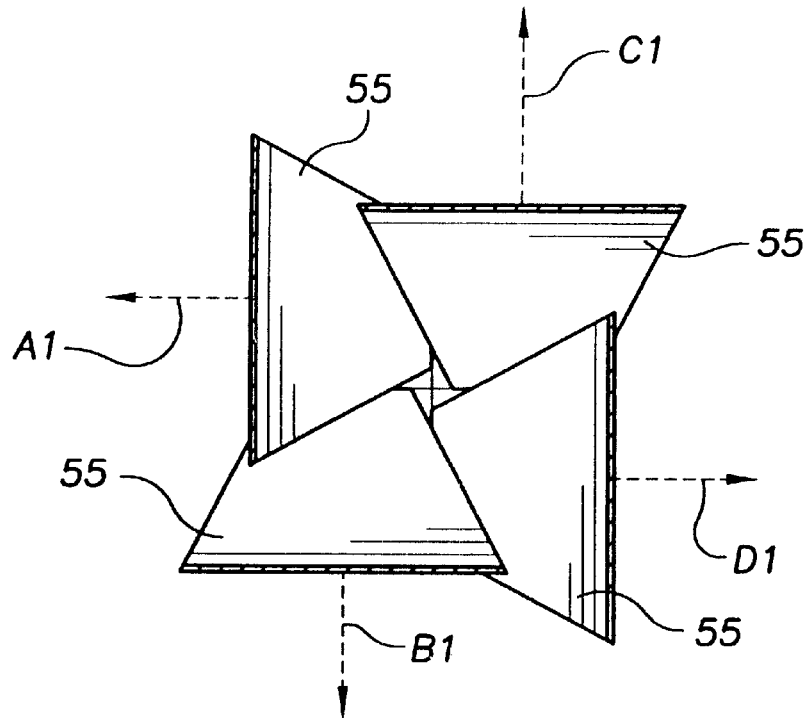
FIG. 10 is a plan view of the detail view shown in FIG. 8.
Figure 11:
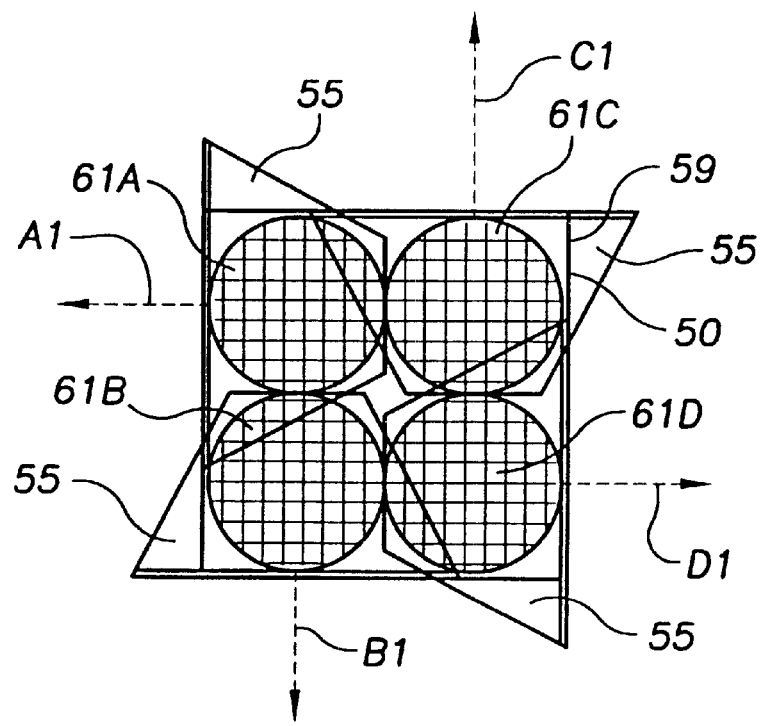
FIG. 11 is a view as in FIG. 10, showing in phantom the image sectors of the display below the mirrors.

The image portions 61A, B, C and D face upward to lens assemblies 57. The light from the image portions 63 passes through the lens assemblies 57, which are preferably lens groupings that cause the light passing therethrough to diverge in a widening conical path. As best shown in FIG. 9, the four trapezoidal mirrors 55 are supported each above a respective lens assembly 57, and these align with the image display portions 63. The mirrors 55 each has a shorter lower end 65 adjacent and above the image display 59 and the lens assemblies, and this lower end 65 has a length that is approximately the same as the lateral dimension of the target image portion 61A, B, C, or D. The mirrors 55 extend obliquely upward from this lower end 65 at a 45-degree slope to a relatively wider upper end 67, flaring wider upwardly. This flaring allows the mirrors 55 to be packed together with the lower ends 65 generally perpendicular to each other, and to accommodate at the same time the widening projection cones of the target images 65 without occulting any of the other mirrors 55 or the mirrors 31 of the gimbaled mirror structures 23.

As can be seen in FIGS. 6, 8, and 9, the stationary mirrors 55 fold the conical image projection beams 90 degrees, to project laterally outwardly of the raised center portion 27 of the base plate 25. These beams are each conical around beam center ray lines A1, B1, C1, and D1, and the beams continue to expand as they proceed outwardly to the mirror structures 23.

The projector beams are reflected by gimbaled mirrors 31 and then proceed through openings 21 in cover 19 to reach the screen 5 and display the target image 65 thereon. Mirror structures 23, as discussed above, have servomotors or step motors that drive the rotation thereof to adjust the angular positions of the mirror 31, and thereby adjust the reflected angles of the beams, and thus the azimuth and elevation of the projected target on screen 5. The angular orientations of the mirror 31 are each individually selectable, and are in a range of about 15 degrees about each axis. The servomotor or step motors are driven by position signals from the image generation system, which uses the simulator data defining the position and nature of the target relative to the observer ownship, i.e., the simulated vehicle itself, and the observer ownship attitude to derive the appropriate values for azimuth and elevation of the target.

The target imagery is supplied from a set of PC graphics cards or from a more sophisticated image generation system that computes and furnishes the multiple target images 63. Each target image 63 is computed independently based on data from the host computer and this preferably includes target attitude, range, visibility, time of day and sun angle.

The target images 63 may be views of the target at various orientations, e.g., a head-on view or a tail end view, or an oblique top or bottom view, not just simple top views as seen in FIG. 7. The orientation and scale of the displayed target is controlled by rotating the target image and enlarging or shrinking it within the associated image portion 63, that is, by displaying the image at the desired orientation and size. The largest target size that can be displayed by the target projector of the preferred embodiment is therefore a target image that fills the entire quadrant, as does the upper left image 63 in FIG. 7.

This dimension is referred to as the nominal size, which is preferably about 5 to 10 inches in the SimuSphere system shown. This size target allows for an acceptable range of target sizes while at the same time keeping the size of projected image pixels small enough to provide eye-limiting or near eye-limiting resolution on the target. If a larger target, i.e., a target that subtends a greater angle than nominal size the target projector can produce, is required, such as when a target aircraft is at very close range, the image generator hands off the particular target image to the coarser imagery of the associated background projector 7, and the target image is blanked off in the target projector 9.

However, because some projector imaging devices produce distracting visual artifacts, it may be desirable, alternatively, to insert a dynamic image rotation optical assembly, such as a pechan prism or a k-mirror assembly in the projection path of the images to control the orientation and/or size of the projected image.

Also, because the target projector is most likely off-axis relative to the screen 5 to provide clearance for the background projector 7 to project the background image over the entire screen 5, the image generation system incorporates necessary keystone corrections in the target images 63 produced on display 50 to compensate for the position of the target projector 7 and to produce proper target images without distortion when projected.

The nominal focus of the projected image is generally preset by lens assemblies 57. Additional lenses are preferably provided in the projection pathway between the beamsplitter assembly 45 and mirror structures 23 that can be controlled by the image generator to change the depth of focus of the images to maintain proper focus as the target image moves across screen 5. The preferred location for these controlled lenses is best indicated in phantom as reference number 69 in FIG. 6.

The terms herein should be read as terms of description rather than limitation, as those of skill in the art with this specification before them will be able to make variations and modifications therein without departing from the spirit of the invention. In particular, it will be understood that the present invention may be applied to any of a variety of simulated vehicles or systems, and to any of a variety of simulator projection systems other than the one of the present illustration. For example, a spherical projection screen instead of a planar one can also be used with the invention herein. Similarly, the target projectors of the present system can be used on new or retrofitted to existing L-3 SimuSphere visual displays, Raytheon F16 UTD visual displays, Raytheon C130 or F18 Reserve VIVID visual displays, and partial dome displays, such as the Taiwan F16, Navy T45, or Air Traffic Control visual displays. Simulated vehicles may include any aircraft, such as, e.g., F-15, F-16, A-10, or various non-U.S. aircraft, non-aircraft such as tanks, or simulations of systems like air traffic control systems.

Similarly, either front- or rear-projection screens may be used with target projection systems incorporating the invention herein.

It will also be understood that more than four images may be projected by a given target projector by dividing the image display screen into a larger number of sectors and providing independent projection assemblies for each of these sectors.

What is claimed is:

1. A projector system for projecting images against a projection screen, said projector system comprising:
    an image display having at least two image display portions each displaying a respective image;
    at least two projection assemblies each associated with a respective image display portion and a respective image, said projection assemblies each receiving the respective image from the respective image display portion and projecting said image on said projection screen; and
    said projection assemblies each including a system for selectively locating the respective projected image on the screen.

2. The projector system according to claim 1 wherein the system for locating the projected image includes a movable mirror positioned to reflect the respective image to the projection screen, the movable mirror being supported on a controlled support system selectively positioning the movable mirror in varying angular positions.

3. The projector system according to claim 1 wherein the image display is a screen divided into pixels and each image display portion is a subset thereof.

4. The projector system according to claim 1 wherein the image display is a DMD or LCD microdisplay.

5. The projector system according to claim 1 wherein the image display is an output of a conventional LCD or DMD projector.

6. The projector system according to claim 1, and said projection assembly including a fold mirror supported adjacent the image display portion receiving the image therefrom and reflecting said image outwardly from the image display to the movable mirror.

7. The projector system according to claim 6, and said projection assembly further including a lens assembly over the image display portion projecting light from the image in a generally conically expanding projection path therefrom to the fold mirror.

8. The projector system according to claim 7, and said fold mirror having an upper end portion and a lower edge portion, said lower edge portion being adjacent the image display portion, said mirror extending obliquely upwardly therefrom.

9. The projector system according to claim 8, and said fold mirror flaring outwardly from said lower edge portion thereof.

10. The projector system according to claim 1, and said fold mirrors being grouped together over the image display, the lower edge portions of adjacent fold mirrors being supported generally perpendicular to each other.

11. The projector system according to claim 1, and said screen having two sides, said images being viewed from the side opposite to the side against which said images are projected.

12. The projector system according to claim 1, and said screen having two sides, said images being viewed from the side against which said images are projected.

13. The projector system according to claim 1, wherein said images are target images.

14. The projector system according to claim 13, and further comprising a background projector projecting a background image against said screen, said background image being at a lower resolution than said projected images.

15. The projector system according to claim 1, wherein said images are displayed at or near eye-limiting resolution.

16. A target projector for projecting images of targets against a projection screen of a simulator system, said projector comprising:
    an image display having at least four image display portions each displaying a respective image;
    at least four projection assemblies each associated with a respective image display portion, said projection assemblies each receiving the respective image from the respective image display portion and projecting said image on said projection screen;

said projection assemblies each comprising
   a lens assembly projecting light from the image in a generally conically expanding projection path therefrom,
   a first mirror receiving the image from the lens assembly and reflecting said image outwardly from the image display,
   said first mirror having an upper end portion and a lower edge portion, said lower edge portion being adjacent the image display portion, said mirror extending obliquely upwardly and flaring outwardly from said lower edge portion,
   a movable mirror positioned to receive the image from the first mirror and reflect the image to the projection screen, the movable mirror being supported on a gimbaled system selectively positioning the movable mirror in varying angular positions to selectively locate the projected image on the screen,
   the first mirrors being grouped together adjacent the image display, the lower edge portions of adjacent mirrors being supported generally perpendicular to each other.

17. The target projector according to claim 16 wherein a background projector projects a background image on the screen superimposed with the projected target projector images, said background image being at a lower resolution than the projected target images.

18. The target projector according to claim 17 wherein said images are displayed at or near eye-limiting resolution.

19. A method for simulating on a projection screen in a simulation system an out-the-window view including a plurality of targets, said method comprising:
   providing a background projector and a target projector both positioned so as to project images on the screen, said target projector, said target projector including an target image display having at least two image display portions each configured to display a respective image and each having associated therewith a respective target projection assembly for receiving and projecting the respective image on said projection screen, said projection assemblies each including a system for independently and selectively locating the projected target image on the screen;
   causing the background projector to project a background image on the screen;
   forming target images on said display portions of the target projector;
   causing the target projector to locate said target images on said projector screen;
   said target images being at a higher resolution than said background image.

20. The method of claim 19 wherein the target images are formed with a distortion to compensate for any angular alignment of the screen with the target projector.

21. The method of claim 19 wherein said target images are displayed at or near eye-limiting resolution.

22. A simulation system comprising:
   a projection screen supported so as to be viewed by a user;
   sensors sensing commands of the user;
   a host computer connected with the sensors and having an image generating system generating OTW imagery including background imagery and target imagery for the user to view;
   a background projector connected with the image generating system and receiving therefrom the background imagery and projecting said background imagery on said projection screen at a background resolution;
   a target projector with the image generating system and receiving therefrom the target imagery and projecting said target imagery on said projection screen at a target resolution, said target projector comprising
      a target image display having at least two target image display portions each displaying a respective target image;
      at least two projection assemblies each associated with a respective target image display portion and a respective target image, said projection assemblies each receiving the respective target image from the respective target image display portion and projecting said target image on said projection screen at a target resolution; and
      said projection assemblies each including a system for selectively locating the respective projected target image on the screen.

23. The simulator system according to claim 22, wherein said target image resolution is approximately eye-limiting resolution for the user.

24. The simulator system according to claim 22, wherein the projection screen is planar.

25. The simulator system according to claim 22, wherein the projection screen is a spherical portion.

26. The simulator system according to claim 22, wherein the projection screen is a rear projection screen.

27. The simulator system according to claim 22 wherein the system for locating the projected target image includes a movable mirror positioned to reflect the respective target image to the projection screen, the movable mirror being supported on a controlled support system selectively positioning the movable mirror in varying angular positions responsive to position data of the target imagery developed by the image generating system.

28. The simulator system according to claim 22 wherein the target image display is a screen divided into pixels and each target image display portion is a subset thereof.

29. The simulator system according to claim 22 wherein the target image display includes graphics circuitry producing said target images based on data derived from said target imagery developed by the image generating system.

30. The simulator system according to claim 29 wherein the graphics circuitry is a PC graphics card.

31. The simulator system according to claim 22 wherein the image generating system blanks the target image display portion for a target image when said target image leaves an operative area of the projection screen.

32. The simulator system according to claim 22 wherein the image generating system blanks the target image display portion for a target image when the image generating system determines that said simulation target imagery requires that the target image to be displayed is larger than a nominal image size for the projection assembly for the target image, and causes said target image to be placed in the background imagery projected by the background projector.

33. The simulator system according to claim 22 wherein the target image display is a DMD or LCD microdisplay.

34. The simulator system according to claim 22 wherein the target image display is an output of a conventional LCD or DMD projector.

35. The simulator system according to claim 22 wherein said projection assembly includes a fold mirror supported adjacent the target image display portion receiving the target image therefrom and reflecting said target image outwardly from the target image display to the movable mirror.

36. The simulator system according to claim 35 wherein the projection assembly further includes a lens assembly over the target image display portion projecting light from the target image in a generally conically expanding projection path therefrom to the fold mirror.

37. The simulator system according to claim 35 wherein the fold mirror has an upper end portion and a lower edge portion, said lower edge portion being adjacent the image display portion, said mirror extending obliquely upwardly therefrom.

38. The simulator system according to claim 37, and said fold mirror flaring outwardly from said lower edge portion thereof.

39. The simulator system according to claim 37, and said fold mirrors being grouped together over the image display, the lower edge portions of adjacent fold mirrors being supported generally perpendicular to each other.

40. The simulator system according to claim 39, and said target image display being divided into four sectors and said fold mirrors comprising four mirrors supported thereabove.

41. The simulator system according to claim 37, and said projection assemblies further comprising an auto alignment system having a photocell receiving light reflected by the movable mirror for alignment of the target projector.

42. The simulator system according to claim 22, wherein the projection screen is a front projection screen.

43. The simulator system according to claim 22, and said projection assemblies each further comprising an adjustable system selectively setting nominal focus of the target image responsive to commands of the image generating system to maintain the target image in focus as said target image moves across said projection screen.

* * * * *